(12) United States Patent
Kaga

(10) Patent No.: US 8,245,196 B2
(45) Date of Patent: Aug. 14, 2012

(54) METHOD FOR VISUALIZING THE EXECUTION OF A SOFTWARE PROGRAM

(75) Inventor: Tomoyuki Kaga, Berkeley, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1359 days.

(21) Appl. No.: 11/837,594

(22) Filed: Aug. 13, 2007

(65) Prior Publication Data

US 2009/0049436 A1    Feb. 19, 2009

(51) Int. Cl.
*G06F 9/44* (2006.01)
(52) U.S. Cl. .......................... 717/125; 717/127
(58) Field of Classification Search .......... 717/104–113, 717/124–129, 144, 154–157
See application file for complete search history.

(56) References Cited

U.S. PATENT DOCUMENTS

| 6,226,787 B1 | 5/2001 | Serra et al. |
| 6,373,484 B1 | 4/2002 | Orell et al. |
| 7,165,238 B2 | 1/2007 | Simonyi |

OTHER PUBLICATIONS

Robbins, "A Java Execution Simulator", Mar. 2007, ACM, pp. 536-540.*
Heath et al, "ParaGraph: A Tool for Visualizing Performance of Parallel Programs", Sep. 1994, CiteSeerX, 50 pages.*
Compton's Encyclopedia Online, "EYE", Sep. 1998, retrieved from http://comptons.aol.com/plweb-cgi/fastweb?getdoc+view1+arts003+1766+24+wAAA+eye, pp. 1-7.*

* cited by examiner

Primary Examiner — Ted T Vo
(74) Attorney, Agent, or Firm — Gifford, Krass, Sprinkle, Anderson & Citkowski, P.C.

(57) ABSTRACT

A method for visualizing the execution of a software program especially in an embedded system. A plurality of interconnected program modules are displayed on a display device wherein at least one of the modules has at least two mutually exclusive different modes of functionality. A unique color is assigned to each mode of functionality. During the execution of the software program, the mode of functionality for each program module during execution of that module is selected as a function of software parameters of the software program. The color of the software module on the display device is then changed to correspond to the color assigned to the selected mode of functionality for the program modules during the execution of the program.

4 Claims, 2 Drawing Sheets

METHOD FOR VISUALIZING THE EXECUTION OF A SOFTWARE PROGRAM

BACKGROUND OF THE INVENTION

I. Field of the Invention

The present invention relates to a method for visualizing the execution of a software program, especially in an embedded system.

II. Description of Related Art

Embedded systems utilizing microprocessors have become more and more prevalent to control a plant or control target. The embedded software utilized to control the execution of these embedded systems typically utilizes a plurality of program modules, each of which produces a value in response to its input parameters, according to control strategies for the plant. Furthermore, any individual program module of the embedded software program may contain two or even more different modes of functionality depending upon various parameters of the software program.

For example, in one mode of functionality for the program module, the program module may generate a value involving linear arithmetic. Conversely, in a different mode the program module performs a calculation utilizing nonlinear arithmetic while in yet a third mode, the program module merely assigns a constant to a particular software parameter.

As the embedded systems become more and more complex, the embedded software program for the embedded system likewise becomes increasingly complex. Consequently, the programming and debugging of the software program for the embedded systems has become increasingly difficult.

In order to facilitate the programming and debugging of the software program for embedded systems, there have been previously known programming tools which displayed the various program modules on a display device, such as a video monitor, and which allowed the programmer to track the operation during the execution or simulated execution of the software program. However, none of these previously known programming tools have differentiated between the different modes of functionality at any given time of the various program modules during execution.

SUMMARY OF THE PRESENT INVENTION

The present invention provides a method for visualizing the execution of a software program which is particularly suited for embedded systems which overcomes the above-discussed disadvantages of the previously known programming tools.

In brief, in the method of the present invention, a plurality of interconnected program modules are first displayed on a display device, such as a video monitor. Each program module, furthermore, receives one or more input parameters and produces an output value as a function of software parameters of the software program module. Each software module, however, may have two or even more different modes of functionality. For example, the software module may perform a linear arithmetic operation under certain software parameters, a nonlinear arithmetic operation under different software parameters or even a simple constant assignment under a still different set of software parameters.

A unique color is then assigned to each mode of functionality for the program modules. The software program is then executed or a simulation of the execution is initiated. During the execution of the software program, the colors of the program modules on the display device are changed to reflect the current mode of functionality of that particular program module during execution of the program module. Consequently, the method of the present invention not only provides visualization of the flow of the computer program through the various program modules on the display device, but also provides an indication of the mode of functionality of each program module as it is executed.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
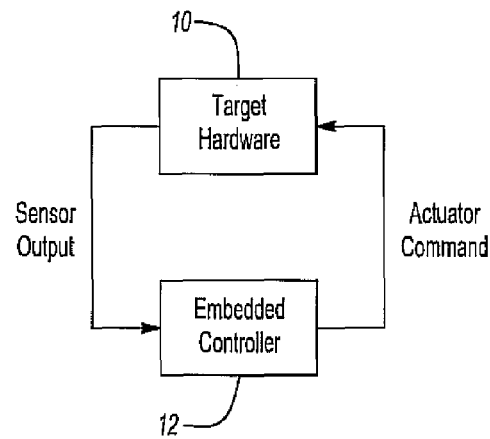
FIG. 1 is a block diagrammatic view illustrating an embedded controller and target hardware.

With reference first to FIG. 1, a block diagrammatic view of an embedded system is shown for controlling a plant or target hardware 10. One or more sensors are associated with the target hardware 10 and these sensors provide an output signal to an embedded controller 12. The embedded controller 12, under control of a software program, utilizes the output from the sensors, after conversion to a usable format such as a digitized value, on the target hardware 10 to provide output signals to control the target hardware 10. In automotive applications, the target hardware 10 may comprise an electronically controlled throttle valve, exhaust gas recirculation valve, etc.

Figure 2:
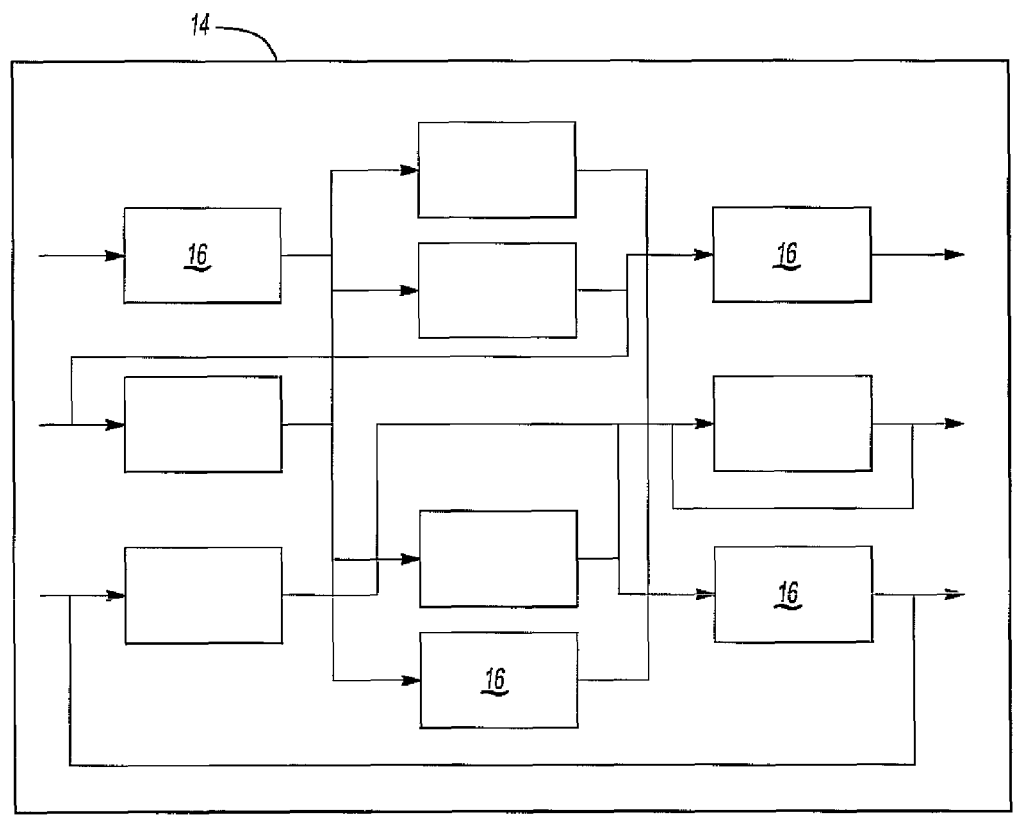
FIG. 2 is a view illustrating an exemplary software program.

With reference now to FIG. 2, an exemplary software program 14 for the embedded controller 12 (FIG. 1) is illustrated. The software program 14 includes a plurality of program modules 16. These program modules 16, furthermore, are interconnected together in a fashion that will vary from one embedded system to another.

Each program module 16 receives one or more input parameters and then generates an output value which varies depending upon the mode of functionality of the individual program modules. The mode of functionality of the individual program modules 16, furthermore, may vary as a function of various target hardware parameters including, for example, the value of output signals from the sensors associated with the target hardware 10.

Figure 3:
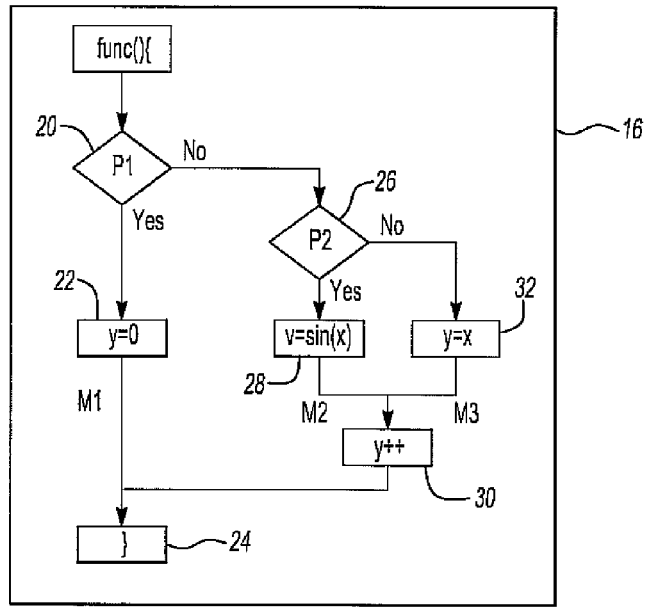
FIG. 3 is a view illustrating an exemplary program module.

With reference now to FIG. 3, an exemplary program module 16 is shown which computes a function. Upon entry to the program module 16, a first decision block 20 examines a first software parameter P1. If P1 is true, step 20 proceeds to step 22 where a software parameter y is assigned the value of zero and then exits from the program module 16 at step 24.

Conversely, if the software parameter P1 is false, step 20 instead branches to step 26. At step 26, the software parameter P2 is examined. If P2 is true, step 26 proceeds to step 28 where a nonlinear arithmetic calculation is performed. Step 28 then proceeds to step 30 where the software parameter y is incremented and step 30 then proceeds to step 24 thus terminating the execution of the program module 16.

Conversely, if the software parameter P2 is false, step 26 will instead branch to step 32 where a linear arithmetic function is performed. Step 32 then proceeds to step 30 where the software parameter y is incremented and then to step 24 thus ending the execution of the control module 16.

Consequently, the program module 16 illustrated in FIG. 3 has three different modes of functionality. The first mode is a constant assignment depending upon the software assignment P1. Conversely, depending upon the parameters P1 and P2, the program module 16 may exhibit the functionality of either a nonlinear arithmetic operation or a linear arithmetic operation.

Figure 4:
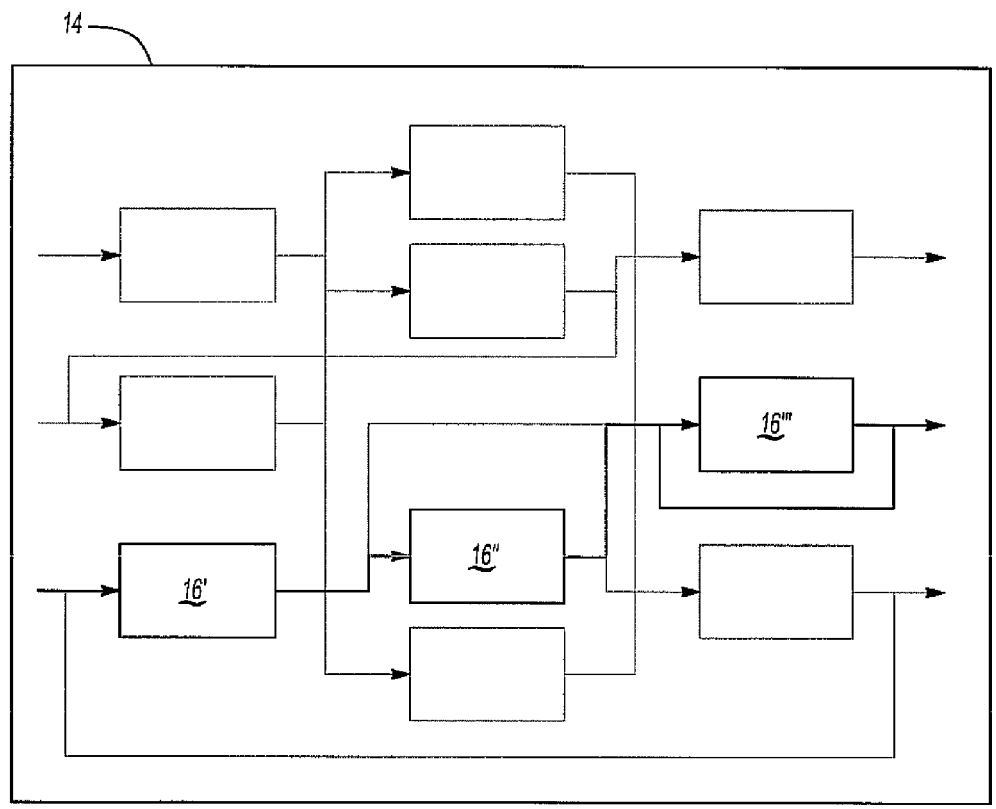
FIG. 4 is a view similar to FIG. 2 of the software program.

With reference now to FIG. 4, a different color is assigned to each different mode of functionality. For example, the color red may be assigned to the functionality of a constant assignment, the color blue assigned to the functionality of a nonlinear arithmetic calculation, while the color yellow may be assigned to the functionality of a linear arithmetic calculation.

With reference then to FIG. 4, the software program 14, or at least a portion of the program 14, is displayed on a display device, such as a video monitor, and the software program for the embedded controller is initiated which, as used herein, includes a simulated execution of the software program. During the execution of the software program, the flow of the software program execution is shown by highlighting the executed program modules, as shown at program module 16', program module 16" and program module 16'''.

For exemplary purposes only, the program modules 16', 16" and 16''' all perform at least two different modes of functionality depending upon various software parameters. For example, upon execution of the first program module 16' and assuming that the mode of functionality is the assignment of a constant, the color of the program module 16' is changed to the color red during its execution. Although any portion of the program module 16 may be changed to the color red, preferably the outline for the program module 16' is changed to the color red.

Following the execution of the program module 16', the program module 16" is executed. At that time, the program module 16' is returned to a neutral color while the color of the program module 16" is changed to reflect its functionality. For example, assuming that the program module 16" performs a nonlinear arithmetic calculation as a function of the engine parameters, the color of the program module 16" is changed to the color blue.

Similarly, after execution of the program module 16", the program module 16" is returned to a neutral color and the software program proceeds to the program module 16'''. Assuming that the program module 16''' performs a linear arithmetic calculation due to the value of various software parameters, the color of the program module 16''' is changed to the color yellow.

From the foregoing, it can be seen that the present invention provides a method to enhance the overall visualization of the execution of a software program which is particularly useful in embedded systems. The method of the present invention not only enables the software execution flow to be followed through the program modules of the software program, but also indicates the functionality mode of the program modules by changing the color of the program modules on the display device.

Having described my invention, however, many modifications thereto will become apparent to those of skill in the art to which it pertains without deviation from the spirit of the invention as defined by the scope of the appended claims.

I claim:

1. A method for depicting the simulated execution of a software program by a controller in an embedded system comprising the steps of:

displaying a plurality of interconnected program modules of the software program on a display device, at least one of the modules having at least two mutually exclusive different modes of functionality, assigning a unique color to each mode of functionality, initiating a simulated execution of the software program by the controller of the embedded system, selecting the mode of functionality of said program modules as a function of software parameters of the software program, and changing the color of a portion of the program modules on the display device to correspond to the assigned unique color of the selected mode of functionality for each said program module during the simulated execution of the program, wherein said modes of functionality are selected from the group of linear arithmetic, non-linear arithmetic and constant assignment.

2. The method as defined in claim 1 wherein said step of initiating the execution of the software program comprises the step of simulating execution of the software program.

3. The method as defined in claim 1 wherein said displaying step further comprises the step of displaying the program modules on a video display.

4. The method as defined in claim 1 wherein said step of changing the color comprises the step of changing an outline defining the program module to said color corresponding to the current mode of functionality of the program module.

\* \* \* \* \*